United States Patent [19] Ueshima et al.

[11] 4,435,212

[45] Mar. 6, 1984

[54] HIGH PERMEABILITY ALLOY

[75] Inventors: Norio Ueshima, Yokohama; Nobuo Okawa, Tokyo; Kiyoshi Takayanagi, Kawasaki, all of Japan

[73] Assignee: The Furukawa Electric Company Ltd., Tokyo, Japan

[21] Appl. No.: 446,974

[22] Filed: Dec. 6, 1982

[30] Foreign Application Priority Data

| | | | |
|---|---|---|---|
| Apr. 15, 1982 | [JP] | Japan | 57-62983 |
| Jul. 30, 1982 | [JP] | Japan | 57-132002 |
| Aug. 3, 1982 | [JP] | Japan | 57-135566 |
| Aug. 12, 1982 | [JP] | Japan | 57-140352 |
| Aug. 23, 1982 | [JP] | Japan | 57-146022 |

[51] Int. Cl.[3] ..... F16H 29/10

[52] U.S. Cl. ..... 75/124; 148/31.55; 420/583

[58] Field of Search ..... 75/124 R, 124 A, 124 E, 75/124 F; 148/31.55; 420/581, 583, 588

[56] References Cited

U.S. PATENT DOCUMENTS

| | | | |
|---|---|---|---|
| 2,988,806 | 6/1920 | Adams et al. | 75/124 |
| 4,130,448 | 12/1978 | Inoue | 75/124 |

FOREIGN PATENT DOCUMENTS

| | | | |
|---|---|---|---|
| 45-34012 | 10/1970 | Japan . | |
| 53-1125 | 1/1978 | Japan | 75/124 |
| 53-7525 | 1/1978 | Japan | 75/124 |
| 53-28018 | 3/1978 | Japan . | |
| 53-79714 | 7/1978 | Japan | 75/124 |
| 55-62144 | 5/1980 | Japan | 75/124 |
| 55-62146 | 5/1980 | Japan | 75/124 |
| 55-62145 | 5/1980 | Japan . | |
| 56-158408 | 7/1981 | Japan | 75/124 |
| 57-39125 | 3/1982 | Japan | 75/124 |

*Primary Examiner*—John P. Sheehan
*Attorney, Agent, or Firm*—Armstrong, Nikaido, Marmelstein & Kubovcik

[57] ABSTRACT

A high permeability alloy having an excellent wear resistance, comprising 3–10 wt % of Al, 4–11 wt % of Si, 2.1–20.0 wt % of Ru and the balance Fe, and further containing or not containing 0.01–1.0 wt % of at least one element selected from a group consisting of rare earth elements, Zr and Nb, and/or 0.2–0.5 wt % of Ti, or 0.5–20.0 wt % of Cr.

10 Claims, 1 Drawing Figure

HIGH PERMEABILITY ALLOY

DETAILED DESCRIPTION OF THE INVENTION

The present invention relates to a high permeability alloy having a high saturated magnetic flux density, a high effective permeability and an excellent wear resistance and usable as, ° particularly, a magnetic head core material capable of obtaining a strong leakage magnetic flux even at a narrow gap.

Recently, owing to the development of the magnetic recording technique, there has been a tendency for the magnetic head core gap width to become much smaller under the necessity of improvement in the recording density. For instance, the head gap width is around 1$\mu$ in case of the audio head, but only 0.2 to 0.3$\mu$ in case of the video picture head. In correspondence with such a tendency, there has been a need for a magnetic head core material having a high (preferably, more than 8000 gauss) saturated magnetic flux density (Bs) so that a strong leakage magnetic flux can be obtained even if the gap width is narrow. Therefore, an Fe-Al-Si ternary alloy called "Sendust" has attracted attention. Although this alloy presents excellent magnetic characteristics and is particularly known as a high permeability alloy having a high saturated magnetic flux density (Bs), its wear resistance is not sufficient for a magnetic head core. Therefore, Sendust-based alloys improved in wear resistance by adding a small amount of special elements have been developed and rapidly spread. However, they are not satisfactory, because they cannot reach ferrite in wear resistance, either.

On the other hand, although ferrite is much more excellent in wear resistance than Sendust and Permalloy, its Bs is generally extremely low: on the order of 5000 gauss.

Nevertheless, as recording media, such magnetic tapes have recently been put to practical use as employing ultra fine powder of metals having high coercive force, instead of conventional metal oxides in order to further improve the recording density. Accordingly, in correspondence with such a tendency, a high magnetic permability alloy having a higher saturated magnetic flux density has been desired for the magnetic head core material.

Moreover, since Sendust is not satisfactory in wear resistance as described above, a small amount of some of special elements is added thereto, but the addition of these special elements is all added thereto, but the addition of these special elements is all harmful to the effective permeability ($\mu$e) and the saturated magnetic flux density (Bs) of Sendust. Therefore, it is impossible to avoid the lowering in the saturated magnetic flux density of the Sendust-based alloys provided with wear resistance. As a result, it is extremely difficult to obtain a magnetic head core having a high saturted magnetic flux density.

On the other hand, ferrite is known as a magnetic head core material. The effective permeability thereof is equal to that of Sendust, and the wear resistance thereof is most excellent in the magnetic head core materials now employed, but the saturated magnetic flux density thereof is low: on the order of 5000 gauss in general. In addition, Permalloy, which is most largely employed as a magnetic head core material, is close to Sendust alloys in both the effective permeability and the saturated magnetic flux density, but the wear resistance thereof is extremely low.

It is, therefore, an object of the present invention to provide a high permeability alloy having a saturated magnetic flux density higher than that of ferrite and a wear resistance equal to or higher than that of ferrite, the high permeability alloy containing 3 to 10 wt% Al (wt% will be referred to as simply "%" hereinafter), 4 to 11% Si, 2.1 to 20% Ru, and the balance Fe.

In other words, as the result of repeating various experiments in order to obtain a material having a wear resistance more excellent than that of ferrite as well as a saturated magnetic flux density higher than that of ferrite, the inventors have known such an extraordinary fact that if 2.1 to 20.0% Ru is added to an Fe-Si-Al ternary alloy comprising 4 to 11% Si, 3 to 10% Al and the balance. Fe, there is relatively small lowering in the effective permeability ($\mu$e) and the saturated magnetic flux density (Bs) of the alloy, and if Ru is added in a smaller quantity, these magnetic characteristics are rather improved, while the coercive force does not largely increase. Moreover, the inventors have found that if not less than 2.1% Ru is added, there is a great improvement in the wear resistance against such a recording medium as a magnetic tape and a magnetic card. Thus, a high permeability alloy particularly suitable for a magnetic head core and capable of obtaining a strong leakage magnetic flux even at a narrow gap has been developed.

According to the present invention, as described above, by adding Ru to a Fe-Al-Si ternary alloy called Sendust, the saturated magnetic flux density is heightened and also the hardness of the alloy is heightened for improvement in wear resistance, with substantially no deterioration in effective permeability and coercive force.

The reason why the composition of the alloy of the present invention is limited as mentioned above is as follows.

Namely, the reason why the Al content and the Si content are limited to 3 to 10% and 4 to 11% respectively is that if either of the contents is less than the lower limits or exceeds the upper limits, the magnetic characteristics, particularly the effective permeability, remarkably lower, so that the alloy cannot be used as a magnetic head core.

Moreover, the reason why the Ru content is limited to 2.1 to 20.0% is that if the Ru content is less than the lower limit, there is no effect of the addition of Ru with respect to the wear resistance, and if Ru is contained exceeding the upper limit, a harmful alloy phase is crystallized, causing the effective magnetic permeability and the saturated magnetic flux density to be rapidly lowered. It is preferable that Ru be contained, desirably, not less than 2.5%, more desirably within a range of 3.0 to 15%, particularly desirably 3 to 6%.

It is, furthermore, another object of the present invention to provide a high permeability alloy having a high saturated magnetic flux density (Bs) and an excellent wear resistance, containing 3 to 10% Al, 4 to 11% Si, 2.1 to 20.0% Ru, 0.2 to 5.0% Ti, and the remainder Fe. In other words, the inventors have learned on fact that, if 0.2 to 5.0% Ti is added to the Fe-Si-Al-Ru alloy, grain boundaries of the alloy are remarkably reinforced, and, therefore, the defects such as chippings, cracks and exfoliations, etc. of the alloy are extremely depressed when the alloy is subjected to processing of grinding, cutting and lapping, etc. and to assembling into heads.

Moreover, the reason why the Ti content is limited to 0.2 to 5.0% is that, if the Ti content is less than the lower limit, the reinforcing effect of the grain boundaries is not enough to depress the occurrence of the defects at the time of the processing and assembling, and, if Ti content is more than the upper limit, all of the magnetic properties are lowered, thus making the magnetic head core useless. It is preferable that Ti is added to the alloy in the range of above 0.7% and below 4.0%.

It is further another object of the present invention to provide a high permeability alloy having a high saturated magnetic flux density (Bs) and an excellent wear resistance, containing 3 to 10% Al, 4 to 11% Si, 2.1 to 20% Ru, 0.2 to 5.0% Ti, 0.01 to 1.0% of at least one element selected from a group consisting of rare earth elements, Zr and Nb, and the remainder Fe. In other words, the inventors have found on fact that, if 0.01 to 1.0% of at least one element selected from a group consisting of rare earth elements, Zr and Nb is added to the Fe-Si-Al-Ru alloy, the wear resistance of the alloy is more improve.

Moreover, by adding at least one element selected from a group consisting of rare earth elements, Zr and Nb, to the alloy, the crystal grains are made fine so that the occurrence of such defects as chippings, cracks, exfoliations and the like during cutting, grinding and assembling in the production of magnetic head cores is largely suppressed and moreover the wear resistance is further improved.

Furthermore, the reason why the content of at least one element selected from a group consisting rare earth elements, Zr and Nb is limited to 0.01 to 1.0% is that if the content of at least one of these elements is less than 0.01%, it is impossible to improve the wear resistance and suppress the production of defects in machining and assembling, and if the content exceeds 1.0%, a fragile compound phase appreares causing the magnetic characteristics to deteriorate and moreover, defects may be produced in machining and assembling. It is to be noted that it is possible to employ as the rare earth element Ce, La, Nd, other cerium-group rare earth elements or Misch metal (containing 40 to 50% Ce, 20 to 40% La and the remainder other rare earth element: referred to as "MM" hereinafter) obtained in the refining process of cerium-group rare earth elements.

It is further another object of the present invention to provide a high permeability alloy having a high saturated magnetic flux density (Bs) and an excellent wear resistance, containing 3 to 10% Al, 4 to 11% Si, 2.1 to 20.0% Ru, 0.01 to 1.0% of at least one of a rare earth element, Zr and Nb, and the balance Fe.

In other words, the inventors have found the fact that, if 0.01 to 1.0% of at least one element selected from a group consisting of rare earth elements Zr and Nb is added to the Fe-Si-Al-Ru alloy, the wear resistance of the alloy is more improved.

It is further another object of the present invention to provide a high permeability alloy having a high saturated magnetic flux density (Bs) and an excellent wear resistance containing 3 to 10% Al, 4 to 11% Si, 2.1 to 20.0% Ru, 0.5 to 20.0% Cr, and the balance Fe.

In other words, the inventors have found the fact that, if 0.5 to 20.0% Cr is added to the Fe-Si-Al-Ru alloy, the wear resistance of the alloy is remarkably improved.

Furthermore, the reason why the content of Cr is limited to 0.5 to 20.0% is that, if the content of Cr is less than 0.5%, satisfactory improvement of the wear resistance thereof can not be attained and, if the content of Cr exceeds 20.0%, the permeability and the saturated magnetic flux density of the alloy is extremely lowered. It is recommended that Cr is added in the range of 3.0% to 15%.

The present invention has the above alloy compositions. The effect obtained by addition of Ru is a very singular and unique phenomenon, and it has been generally considered that the addition of any fourth element other than Fe, Al and Si to a Sendust alloy, in most cases reduces the saturated magnetic flux density of the alloy and effective permeability thereof and increases the coercive force. Therefore, the addition of a fourth element in order to heighten the hardness of the alloy for improving the wear resistance damages the magnetic characteristics without exception. However, the addition of Ru within a specific range in the alloy of the present invention improves in cooperation with the addition of Ti and/or at least one element selected from a group consisting of rare earth elements, Zr and Nb, or Cr, the saturated magnetic flux density and the wear resistance without deteriorating the effective permeability and the coercive force, and particularly, the improvement in the effective permeability is achieved. Thus, the alloy of the present invention has such a high saturated magnetic flux density as to break the limit of ferrite as a conventional magnetic head material as well as an excellent wear resistance and can greatly contribute to the development of the magnetic recording technique.

Examples of the alloy of the present invention will be described hereinafter in detail.

Figure 1:
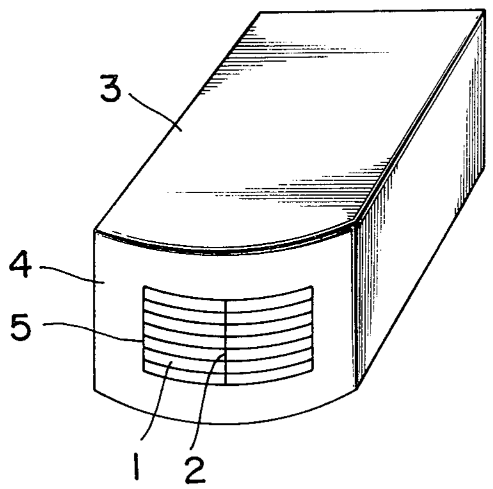
FIG. 1 is a perspective view of a dummy head for testing the wear resistance.

1: test place 2: Ti foil 3: Brass fixing frame 4: curved surface 5: square hollow hole

EXAMPLE 1

Electrolytic iron of purity 99.9%, Al of purity 99.9%, Si of purity 99.9% and Ru of purity 99.9% were mixed in various percentages and melted in an alumina crucible by a high-frequency vacuum melting furnace (vacuum degree: 3 to $10\times10^{-3}$ mmHg), and then cast into a cast-iron mold to obtain ingots with a thickness of 25 mm, a width of 25 mm and a length of 160 mm and having compositions shown in Table 1. These ingots were discharge machined, wire-cut and lapped to form magnetic characteristic measuring rings with an outside diameter of 8 mm, an inside diameter of 4 mm and a thickness of 0.2 mm and wear resistance measuring test pieces with a thickness of 0.6 mm, a width of 3.2 mm and a length of 8.5 mm. These were subjected to a heat treatment for 1 hour at 1000° C. under a vacuum and then, the magnetic characteristics and the wear resistance were measured. Table 1 shows the results thereof.

By using magnetic characteristic measuring rings B-H curves were drawn with a B-H tracer, and the saturated magnetic flux density and the coercive force were obtained therefrom and moreover, the effective magnetic permeability at 1 KHz was measured by means of a vector impedance meter. For measurement of wear resistance as shown in FIG. 1, test piece stacks each having seven test pieces (1) were made to face to each other with a Ti foil of 1.2 μm thick put between them. These stacks were inserted into a brass fixing frame (3) having a square hollow hole (5) with a width of 6.4 mm and a height of 4.2 mm on the curved surface (4) with a radius 10 mm and secured with resin. Then, the curved surface was ground with GC grind stone of No. 2000 to produce a dummy head for testing the wear resistance. The dummy head was mounted on a cassett deck, and a magnetic tape was made to run in contact with the curved surface for 300 hours in an atmosphere having a temperature of 30° C. and a humidity of 75% to measure the wear depth in the tape sliding surface of the test pieces.

As apparent from Table 1, all of the alloys of the present invention have a wear resisrance superior to that of the conventional material (ferrite), without deterioration in the effective permeability and the saturated magnetic flux density as compared with the conventional one.

As understood from the comparison, particularly, between the alloys of the present invention No. 1 through No. 6 and the conventional material 12, the alloys of the present invention have also an effective permeability in the range of the Ru content being 2.2 to 5.0% superior to that of the conventional Sendust alloy, and have remarkably improved wear resistance in the range of the Ru content being 7 to 20%, despite somewhat lowering of the effective permeability and the saturated magnetic flux density.

Moreover, as apparent from the comparison of the conventional alloy No. 12 with the conventional one No. 15 and No. 16, alloys in which small amount of Ti or Zr is added, are a little improved in the wear resistance respectively, but are lowered in the saturated magnetic flux density and the effective permeability.

As described above, the present invention provides alloys demonstrating such industrially remarkable effects that they have an excellent wear resistance together with a high effective permeability and a high saturated magnetic flux density and they are capable of obtaining a strong leakage magnetic flux even at a narrow gap when used as a magnetic head core material.

TABLE 1

| | | Composition (%) | | | | | Saturated magnetic flux density | Coercive force | Effective permeability | Wear depth |
|---|---|---|---|---|---|---|---|---|---|---|
| Alloy | No. | Si | Al | Ru | Other | Fe | Bs (G) | Hc (Oe) | (μe) | (μm) |
| Alloy of invention | 1 | 9.6 | 6.0 | 2.2 | — | Balance | 9,4000 | 0.02 | 14,200 | 1.8 |
| Alloy of invention | 2 | " | " | 3.0 | — | " | 9,500 | 0.02 | 15,000 | 1.7 |
| Alloy of invention | 3 | " | " | 5.0 | — | " | 9,800 | 0.04 | 14,500 | 1.3 |
| Alloy of invention | 4 | " | " | 7.0 | — | " | 8,600 | 0.05 | 10,000 | 1.2 |
| Alloy of invention | 5 | " | " | 10.0 | — | " | 7,500 | 0.07 | 7,500 | 0.9 |
| Alloy of invention | 6 | " | " | 15.0 | — | " | 6,400 | 0.09 | 6,000 | 0.7 |
| Alloy of invention | 7 | " | " | 20.0 | — | " | 5,200 | 0.12 | 4,200 | 0.5 |
| Alloy of invention | 8 | 6.0 | 4.0 | 4.0 | — | " | 13,500 | 0.04 | 4,300 | 1.8 |
| Alloy of invention | 9 | 6.0 | 4.0 | 5.0 | — | " | 14,600 | 0.05 | 4,800 | 1.6 |
| Alloy of invention | 10 | 10.0 | 5.6 | 5.0 | — | " | 11,500 | 0.02 | 18,600 | 1.2 |
| Alloy of invention | 11 | 5.0 | 9.0 | 5.0 | — | " | 12,500 | 0.03 | 4,400 | 1.5 |
| Conventional material (Sendust) | 12 | 9.6 | 6.0 | — | — | " | 9,200 | 0.02 | 13,500 | 9.2 |
| Conventional material (Sendust) | 13 | 9.4 | 6.5 | — | — | " | 8,800 | 0.03 | 12,000 | 9.5 |
| Conventional material (Sendust) | 14 | 8.0 | 8.0 | — | Cr 3.0 | " | 7,300 | 0.04 | 11,300 | 6.4 |
| Conventional material (Sendust) | 15 | 9.6 | 6.0 | — | Ti 1.0 | " | 8,900 | 0.03 | 13,100 | 6.8 |
| Conventional material (Sendust) | 16 | 9.6 | 6.0 | — | Zr 0.1 | " | 8,700 | 0.03 | 12,700 | 6.1 |
| Conventional material (Sendust) | 17 | 10.0 | 5.5 | — | Ti 1.0 | " | 8,800 | 0.1 | 8,500 | 5.9 |
| Conventional material (Ferrite) | 18 | — | — | — | — | — | 5,000 | 0.1 | 10,000 | 1.9 |
| Conventional material (Permalloy) | 19 | — | — | — | Ni 78 | Balance | 8,000 | 0.02 | 10,000 | 5.2 |

EXAMPLE 2

The test pieces were prepared in the same way as in Example 1, except that Ti of purity 99.9% was added in various ratios, and subjected to measuring of the magnetic characteristics and the wear resistance. By using wear resistance measuring test pieces, micro Vickers hardness and grain size were measured. The result is shown in Table 2.

Moreover, a square bar with a thickness of 20 mm, a width of 20 mm and a length of 100 mm was prepared from each of the ingots, and one side surface thereof was ground with a GC grindstone in order to measure the number of cracks produced at the edge of the ground surface and that of exfoliations in a 1 cm-square region selected at random within the ground surface. The results are also shown in Table 2. As obvious from Table 2, all the alloys of the present invention have a wear resistance superior to that of ferrite and have a fewer defects than ferrite without deterioration in the saturated magnetic flux density as compared with ferrite.

As understood from the comparison of the present invention alloy No. 1 to No. 13 with the conventional alloy No. 17, No. 18, No. 20 and No. 21, the alloys containing both 3.0–5.0% Ru and 0.3–3.0% Ti are excellent in the effective permeability, the saturated magnetic flux density and the wear resistance, and have the very small number of defects produced.

Moreover, as apparent from comparing the conventional alloy No. 18 with No. 21, and No. 22, the alloy, in which a small amount of Ti or Ti and Zr is added, has been improved to some extent in the wear resistance and the occurrence of the defects, but has been lowered in the effective permeability and the saturated magnetic flux density, respectively.

As described above, the present invention provides alloys presenting such industrially remarkable effects that they have high effective permeability, a high saturated magnetic flux density, and excellent wear resistance, and show few defects when machined and assembled. Moreover they are usable as a magnetic head core material capable of obtaining a strong leakage magnetic flux even at a narrow gap.

TABLE 2

| Alloy | No | Composition (%) Si | Al | Ru | Ti | Other | Fe | Saturated magnetic flux density Bs (G) | Coercive force Hc (Oe) | Effective permeability (μe) | Micro-Vickers hardness | Wear depth (μm) | Number of defects produced |
|---|---|---|---|---|---|---|---|---|---|---|---|---|---|
| Alloy of invention | 1 | 9.6 | 6.0 | 2.2 | 1.0 | — | Balance | 9,250 | 0.03 | 14,000 | 520 | 1.7 | 7 |
| Alloy of invention | 2 | " | " | 3.0 | " | — | " | 9,360 | 0.03 | 14,800 | 570 | 1.5 | 7 |
| Alloy of invention | 3 | " | " | 5.0 | " | — | " | 9,600 | 0.05 | 15,000 | 640 | 1.2 | 6 |
| Alloy of invention | 4 | " | " | 5.0 | 0.3 | — | " | 9,750 | 0.03 | 14,600 | 610 | 1.4 | 9 |
| Alloy of invention | 5 | " | " | " | 0.7 | — | " | 9,640 | 0.04 | 14,400 | 630 | 1.3 | 8 |
| Alloy of invention | 6 | " | " | " | 2.0 | — | " | 9,370 | 0.05 | 13,900 | 650 | 1.1 | 6 |
| Alloy of invention | 7 | " | " | " | 3.0 | — | " | 8,950 | 0.05 | 13,200 | 660 | 1.1 | 5 |
| Alloy of invention | 8 | " | " | " | 4.0 | — | " | 8,500 | 0.06 | 12,500 | 680 | 1.0 | 6 |
| Alloy of invention | 9 | " | " | " | 5.0 | — | " | 8,100 | 0.07 | 9,700 | 690 | 0.9 | 7 |
| Alloy of invention | 10 | " | " | 7.0 | 1.0 | — | " | 8,400 | 0.05 | 9,800 | 600 | 1.0 | 6 |
| Alloy of invention | 11 | " | " | 10.0 | " | — | " | 7,300 | 0.08 | 7,200 | 580 | 0.8 | 8 |
| Alloy of invention | 12 | " | " | 15.0 | " | — | " | 6,200 | 0.10 | 6,500 | 550 | 0.6 | 8 |
| Alloy of invention | 13 | " | " | 20.0 | " | — | " | 5,000 | 0.12 | 4,000 | 600 | 0.4 | 9 |
| Alloy of invention | 14 | 6.0 | 4.0 | 5.0 | " | — | " | 13,500 | 0.04 | 4,400 | 470 | 1.5 | 10 |
| Alloy of invention | 15 | " | " | " | " | — | " | 14,200 | 0.04 | 4,600 | 490 | 1.3 | 10 |
| Alloy of | 16 | 10.0 | 5.5 | — | " | — | " | 9,300 | 0.05 | 9,000 | 660 | 1.2 | 7 |
| Conventional alloy (Sendust) | 17 | 9.6 | 6.0 | 0.5 | — | — | " | 9,200 | 0.02 | 13,500 | 470 | 9.2 | 31 |
| Conventional alloy (Sendust) | 18 | 9.6 | 6.0 | — | — | — | " | 9,250 | 0.02 | 13,700 | 640 | 6.2 | 34 |
| Conventional alloy (Sendust) | 19 | 8.0 | 8.0 | — | — | Cr 3.0 | " | 7,300 | 0.04 | 11,300 | 470 | 6.4 | 36 |
| Conventional alloy (Sendust) | 20 | 9.6 | 6.0 | — | 1.0 | — | " | 8,900 | 0.03 | 13,100 | 490 | 6.8 | 17 |
| Conventional alloy (Sendust) | 21 | 9.6 | 6.0 | — | — | Zr 0.1 | " | 8,700 | 0.03 | 12,700 | 500 | 6.1 | 16 |
| Conventional alloy (Sendust) | 22 | 10.0 | 5.5 | — | 1.0 | — | " | 8,800 | 0.05 | 8,500 | 480 | 18 | |
| Conventional material (Ferrite) | 23 | — | — | — | — | — | — | 5,000 | 0.1 | 10,000 | 650 | 1.9 | 200 |
| Conventional material | 24 | — | — | — | — | Ni 78 | Balance | 8,000 | 0.02 | 10,000 | 130 | 52.0 | 0 |

TABLE 2-continued

| Alloy | No | Composition (%) Si | Al | Ru | Ti | Other | Fe | Saturated magnetic flux density Bs (G) | Coercive force Hc (Oe) | Effective permeability (μe) | Micro-Vickers hardness | Wear depth (μm) | Number of defects produced |
|---|---|---|---|---|---|---|---|---|---|---|---|---|---|
| (Permalloy) | | | | | | | | | | | | | |

EXAMPLE 3

The test pieces were prepared in the same way as in Example 2, except that at least one element selected from a group consisting of Ti, Ce, La, Nd, M.M., Zr and Nb was added to the alloy, and subjected to measuring of the magnetic characteristics, the wear resistance and the number of defects produced to give the result shown in Table 3.

TABLE 3

| Alloy | No | Composition (%) Si | Al | Ru | Ti | Others | Fe | Saturated magnetic flux density Bs (G) | Co-ercive force Hc (Oe) | Effective perme-ability (μe) | Micro-Vickers hardness | Wear depth (μm) | Number of defects produced | Aver-age grain size (μm) |
|---|---|---|---|---|---|---|---|---|---|---|---|---|---|---|
| Alloy of invention | 1 | 9.6 | 6.0 | 2.2 | 1.0 | MM 0.1 | Balance | 9,240 | 0.02 | 13,400 | 510 | 1.2 | 0 | 50 |
| Alloy of invention | 2 | " | " | 3.0 | " | " " | " | 9,330 | 0.04 | 14,000 | 640 | 0.9 | 0 | 30 |
| Alloy of invention | 3 | " | " | 5.0 | " | " " | " | 9,580 | 0.05 | 14,400 | 700 | 0.7 | 0 | 30 |
| Alloy of invention | 4 | " | " | " | " | " " | " | 9,740 | 0.03 | 14,500 | 680 | 0.9 | 0 | 70 |
| Alloy of invention | 5 | " | " | " | 0.3 | " " | " | 9,640 | 0.04 | 14,300 | 700 | 0.8 | 0 | 50 |
| Alloy of invention | 6 | " | " | " | 0.7 | " " | " | 9,320 | 0.05 | 13,700 | 710 | 0.6 | 0 | 20 |
| Alloy of invention | 7 | " | " | " | 2.0 | " " | " | 8,930 | 0.05 | 13,000 | 730 | 0.5 | 0 | <20 |
| Alloy of invention | 8 | " | " | " | 3.0 | " " | " | 8,480 | 0.06 | 11,400 | 740 | 0.5 | 1 | <20 |
| Alloy of invention | 9 | " | " | " | 4.0 | " " | " | 8,990 | 0.08 | 8,800 | 740 | 0.4 | 2 | <20 |
| Alloy of invention | 10 | " | " | 10.0 | 5.0 | " " | " | 7,370 | 0.06 | 7,150 | 600 | 0.3 | 0 | 30 |
| Alloy of invention | 11 | " | " | 15.0 | 1.0 | " " | " | 6,150 | 0.11 | 6,300 | 660 | 0.3 | 2 | 30 |
| Alloy of invention | 12 | " | " | 20.0 | " | " " | " | 4,900 | 0.13 | 3,700 | 590 | 0.2 | 0 | 30 |
| Alloy of invention | 13 | 9.7 | 5.8 | 5.0 | " | " " | " | 9,450 | 0.04 | 17,100 | 710 | 0.7 | 0 | 20 |
| Alloy of invention | 14 | 6.0 | 4.0 | 2.2 | " | " " | " | 13,100 | 0.04 | 4,100 | 450 | 1.2 | 0 | 30 |
| Alloy of invention | 15 | " | " | 5.0 | " | " " | " | 13,700 | 0.04 | 4,600 | 500 | 1.1 | 0 | 70 |
| Alloy of invention | 16 | 10.0 | 5.5 | " | " | " " | " | 9,290 | 0.06 | 9,300 | 690 | 1.3 | 0 | 30 |
| Alloy of invention | 17 | 9.6 | 6.0 | 5.0 | " | " 0.01 | " | 9,600 | 0.03 | 14,100 | 700 | 1.2 | 1 | 50 |
| Alloy of invention | 18 | 9.6 | 6.0 | 5.0 | 1.0 | " 0.05 | " | 9,590 | 0.03 | 14,400 | 700 | 1.2 | 0 | 50 |
| Alloy of invention | 19 | " | " | " | " | " 0.3 | " | 9,250 | 0.04 | 14,200 | 720 | 0.6 | 0 | 20 |
| Alloy of invention | 20 | " | " | " | " | " 1.0 | " | 8,700 | 0.06 | 13,800 | 730 | 0.5 | 0 | <20 |
| Alloy of invention | 21 | " | " | " | " | Ce 0.1 | " | 9,580 | 0.03 | 14,600 | 700 | 0.7 | 0 | 30 |
| Alloy of invention | 22 | " | " | " | " | La 0.1 | " | 9,570 | 0.03 | 14,500 | 690 | 0.7 | 0 | 30 |
| Alloy of invention | 23 | " | " | " | " | Nb 0.05 | " | 9,590 | 0.03 | 14,300 | 710 | 0.9 | 1 | 70 |
| Alloy of invention | 24 | " | " | " | " | " 0.3 | " | 9,200 | 0.04 | 13,700 | 740 | 0.4 | 0 | 50 |
| Alloy of invention | 25 | " | " | " | " | Zr 0.05 | " | 9,570 | 0.03 | 14,300 | 690 | 0.6 | 1 | 50 |
| Alloy of invention | 26 | " | " | " | " | " 0.10 | " | 9,500 | 0.03 | 13,900 | 700 | 0.4 | 0 | 30 |
| Alloy of invention | 27 | " | " | " | " | MM 0.3, Nb 0.3 | " | 9,000 | 0.06 | 13,000 | 730 | 0.3 | 0 | 30 |
| Alloy of invention | 28 | " | " | " | " | MM 0.3, Zr 0.1 | " | 9,150 | 0.05 | 13,300 | 720 | 0.3 | 0 | <20 |
| Comparative alloy | 29 | " | " | 3.0 | " | MM 0.005 | " | 9,360 | 0.03 | 14,800 | 570 | 1.5 | 6 | 200 |
| Comparative alloy | 30 | " | " | " | " | MM 1.5 | " | 8,050 | 0.15 | 3,200 | 680 | 1.0 | 0 | <10 |
| Comparative | 31 | " | " | " | 0.1 | MM 0.1 | " | 9,460 | 0.02 | 13,700 | 570 | 1.5 | 5 | 80 |

TABLE 3-continued

| Alloy | No | Composition (%) | | | | | | Saturated magnetic flux density Bs (G) | Co-ercive force Hc (Oe) | Effective perme-ability (μe) | Micro-Vickers hardness | Wear depth (μm) | Number of defects produced | Aver-age grain size (μm) |
|---|---|---|---|---|---|---|---|---|---|---|---|---|---|---|
| | | Si | Al | Ru | Ti | Others | Fe | | | | | | | |
| alloy | | | | | | | | | | | | | | |
| Comparative alloy | 32 | " | " | " | 6.0 | " " | " | 7,500 | 0.10 | 3,800 | 730 | 0.7 | 0 | <10 |
| Comparative alloy | 33 | " | " | 1.5 | 1.0 | " " | " | 9,150 | 0.03 | 13,300 | 470 | 6.0 | 3 | 60 |
| Comparative alloy | 34 | " | " | 25.0 | " | " " | " | 1,950 | 0.16 | 11,000 | 680 | 0.4 | 0 | 30 |
| Conventional alloy | 35 | " | " | — | — | — | " | 9,200 | 0.02 | 13,500 | 470 | 9.2 | 31 | 800 |
| Conventional alloy | 36 | 8.0 | 8.0 | — | — | Cr: 3.0 | " | 7,300 | 0.04 | 11,300 | 470 | 6.4 | 36 | 900 |
| Conventional alloy | 37 | 9.6 | 6.0 | — | 1.0 | Zr: 0.1 | " | 8,700 | 0.03 | 12,700 | 500 | 6.1 | 5 | 100 |
| Conventional material (Ferrite) | 38 | — | — | — | — | — | — | 5,000 | 0.10 | 10,000 | 650 | 1.9 | 200 | 50 |
| Conventional material (Permalloy) | 39 | — | — | — | — | Ni 78 | Balance | 8,000 | 0.02 | 10,000 | 130 | 52.0 | 0 | 100 |

As apparent from Table 3, the alloys of the present invention are improved in the saturated magnetic flux density and the wear resistance and have remarkably small number of defects produced at the time of processing, compared with the conventional material (ferrite) No. 38.

As understood from the data of the alloys No. 1–No. 3, the addition of Ru remarkably improves the saturated magnetic flux density, the hardness, the wear resistance and the occurrence of the defects at the time of processing and moreover does not largely deteriorate the coercive force, with the increase of the Ru content.

In particular, in case of the Ru content being below 5.0%, it is understood that the effective permeability of the alloys is also rather improved.

As understood from No. 4 to No. 9 of the present invention alloys, the addition of Ti improves the hardness and the wear resistance, without lowering the magnetic characteristics to significant degree.

Furthermore, it is understood from No. 17 to No. 20 of this invention alloys that the addition of MM further increases the hardness and the wear resistance without significant lowering of the magnetic characteristics.

On the contrary, in No. 29 of the comparative alloy whose content of MM is less than 0.01%, the grain refining effect can not be recognized, and the number of defects produced is increased.

In No. 30 of the comparative alloy whose content of MM is more than 1.0%, the magnetic characteristics thereof are lowered and in No. 31 of the comparative alloy whose Ti content is low, the grain refining effect is not satisfactory and the occurrence of the defects produced in the processing is numerous. In No. 32 of the comparative alloy whose Ti content is above 5.0%, the magnetic characteristics thereof are remarkably lowered.

Moreover, in No. 33 of the comparative alloy whose Ru content is below 2.1%, the saturated magnetic flux density and the wear resistance thereof are hardly improved.

In No. 34 of the comparative alloy whose Ru content is more than 20.0%, the lowering of the magnetic characteristics is recognized.

EXAMPLE 4

The test pieces were prepared in the same way as in Example 2, except that one or two elements selected from a group consisting of MM of purity 99.9%, La of purity 99.9%, Ce of purity 99.9%, Zr of purity 99.9% and Nb of purity 99.9%, were added and were subjected to the measurements to give the magnetic characteristics, the wear resistance and the number of exfoliation. Results are shown in Table 4.

As apparent from Table 4 all the alloys of the present invention are remarkably improved in the saturated magnetic flux density and the wear resistance as compared with the conventional material (ferrite) No. 30 and have smaller numbers of defects produced than the same.

As understood from the comparison, particularly, between the alloys of the present invention No. 1 thru No. 6 and the conventional alloy No. 25, the saturated magnetic flux density and the wear resistance are improved by addition of Ru without largely deteriorating the coercive force, and the effective permeability is also improved when the Ru content was within a range of 2.2 to 5.0%.

Moreover, as apparent from the comparison between the alloys of the present invention No. 7 thru No. 10 and the conventional alloy No. 25, the hardness increases without largely deteriorating such magnetic characteristics as the saturated magnetic flux density and the effective permeability and moreover, the crystal grains are fined, the wear resistance is further improved and the number of defects produced is decreased by addition of Ru.

On the other hand, the comparison alloy No. 21 having a Ru content not more than 2.1% shows no improvement in saturated magnetic flux density, wear resistance and defect production. Moreover, the comparison alloy No. 22 having a Ru content not less than 20.0% shows a large deterioration of the magnetic characteristics. Furthermore, the comparison alloy No. 23 having a rare earth element content not more than 0.01% shows no improvement in the grain refining, while the comparison alloy No. 24 having a rare earth element content not less than 1.0% shows a large deterioration of the magnetic characteristics.

TABLE 4

| Alloy | No. | Compositions (%) Si | Al | Ru | Others | Fe | Saturated magnetic flux density Bs (G) | Co-ercive force Hc (Oe) | Effective perme-ability (1 KHz) | Micro-Vickers hardness | Wear depth (μm) | Number of exfoliations produced | Aver-age grain size (μm) |
|---|---|---|---|---|---|---|---|---|---|---|---|---|---|
| Alloy of invention | 1 | 9.6 | 6.0 | 2.2 | MM 0.1 | Balance | 9,380 | 0.02 | 13,600 | 500 | 1.6 | 5 | 90 |
| Alloy of invention | 2 | " | " | 3.0 | " " | " | 9,470 | 0.02 | 13,800 | 560 | 1.5 | 6 | 80 |
| Alloy of invention | 3 | " | " | 5.0 | " " | " | 9,780 | 0.04 | 14,000 | 660 | 1.3 | 5 | 80 |
| Alloy of invention | 4 | " | " | 10.0 | " " | " | 7,320 | 0.08 | 7,300 | 570 | 1.1 | 5 | 70 |
| Alloy of invention | 5 | " | " | 15.0 | " " | " | 6,350 | 0.10 | 5,800 | 540 | 0.7 | 6 | 60 |
| Alloy of invention | 6 | " | " | 20.0 | " " | " | 5,180 | 0.12 | 4,000 | 610 | 0.5 | 7 | 40 |
| Alloy of invention | 7 | " | " | 5.0 | " 0.01 | " | 9,800 | 0.04 | 14,500 | 650 | 1.7 | 10 | 350 |
| Alloy of invention | 8 | " | " | " | " 0.05 | " | 9,790 | 0.04 | 14,600 | 680 | 1.6 | 5 | 100 |
| Alloy of invention | 9 | " | " | " | " 0.3 | " | 9,250 | 0.05 | 13,500 | 680 | 1.4 | 5 | 40 |
| Alloy of invention | 10 | " | " | " | " 1.0 | " | 8,700 | 0.09 | 12,000 | 690 | 1.1 | 7 | <20 |
| Alloy of invention | 11 | " | " | " | Ce 0.1 | " | 9,770 | 0.04 | 14,700 | 670 | 1.5 | 6 | 70 |
| Alloy of invention | 12 | " | " | " | La 0.1 | " | 9,780 | 0.04 | 14,600 | 660 | 1.4 | 5 | 80 |
| Alloy of invention | 13 | " | " | " | Nb 0.05 | " | 9,760 | 0.04 | 14,500 | 680 | 1.6 | 6 | 120 |
| Alloy of invention | 14 | " | " | " | " 0.3 | " | 9,740 | 0.05 | 14,000 | 720 | 1.2 | 5 | 80 |
| Alloy of invention | 15 | " | " | " | Zr 0.05 | " | 9,750 | 0.05 | 14,000 | 670 | 1.5 | 6 | 90 |
| Alloy of invention | 16 | " | " | " | " 0.1 | " | 9,760 | 0.06 | 13,800 | 670 | 1.4 | 6 | 120 |
| Alloy of invention | 17 | " | " | " | MM 0.1<br>Nb 0.1 | " | 9,750 | 0.04 | 14,300 | 680 | 1.3 | 5 | 70 |
| Alloy of invention | 18 | " | " | " | Ce 0.1<br>Zr 0.1 | " | 9,750 | 0.06 | 13,600 | 670 | 1.2 | 5 | 60 |
| Alloy of invention | 19 | 9.7 | 5.8 | 5.0 | MM 0.1 | " | 9,880 | 0.04 | 16,900 | 680 | 1.5 | 5 | 80 |
| Alloy of invention | 20 | 6.0 | 4.0 | 2.2 | " " | " | 13,300 | 0.04 | 4,300 | 440 | 1.7 | 5 | 120 |
| Comparison alloy | 21 | 9.6 | 6.0 | 1.5 | " " | " | 9,300 | 0.03 | 13,300 | 470 | 6.3 | 34 | 800 |
| Comparison alloy | 22 | " | " | 25.0 | " " | " | 2,000 | 0.15 | 1,000 | 630 | 0.4 | 30 | 30 |
| Comparison alloy | 23 | " | " | 5.0 | MM 0.005 | " | 9,800 | 0.04 | 14,200 | 610 | 1.3 | 32 | 400 |
| Comparison alloy | 24 | " | " | 5.0 | MM 1.5 | " | 8,150 | 0.14 | 3,500 | 670 | 1.1 | 0 | <15 |
| Conventional alloy | 25 | " | " | — | — | " | 9,200 | 0.02 | 13,500 | 470 | 9.2 | 31 | 800 |
| Conventional alloy | 26 | 9.4 | 6.5 | — | — | " | 8,800 | 0.03 | 12,000 | 460 | 9.5 | 34 | 800 |
| Conventional alloy | 27 | 8.0 | 8.0 | — | Cr 3.0 | " | 7,300 | 0.04 | 11,300 | 470 | 6.4 | 36 | 900 |
| Conventional alloy | 28 | 9.6 | 6.0 | — | Ti 1.0 | " | 8,900 | 0.03 | 13,100 | 490 | 6.8 | 17 | 250 |
| Conventional alloy | 29 | 9.6 | 6.0 | — | Zr 0.1 | " | 8,700 | 0.03 | 12,700 | 500 | 6.1 | 16 | 100 |
| Conventional material (Ferrite) | 30 | — | — | — | — | — | 5,000 | 0.10 | 10,000 | 650 | 1.9 | 200 | 50 |
| Conventional material (Permalloy) | 31 | — | — | — | Ni 78 | Balance | 8,000 | 0.02 | 10,000 | 130 | 52.0 | 0 | 100 |

EXAMPLE 5

The test pieces were prepared in the same way as in Example 1, except that Cr of purity 99.9% was added, and were subjected to measuring of the magnetic characteristics and the wear resistance. Results are shown in Table 5.

As obvious from Table 5, all the alloys of this invention are more improved in the wear resistance than ferrite, without lowering of the saturated magnetic flux density thereof below that of ferrite.

In particular, as understood from comparison of the invented alloys No. 1 to No. 3 with the conventional alloy No. 19, the effective permeability is also more improved than the conventional Sendust alloy containing Cr, in the range of 2.2 to 5.0% Ru content.

On the other hand, it is understood that, when alloys of the present invention contain 7 to 20% of Ru, the wear resistance thereof is remarkably improved though their effective permeability and saturated magnetic flux density lower a little.

On the contrary, as apparent from comparison of the conventional alloy No. 19 with No. 20 and No. 21, the alloy containing a small amount of Ti and the alloy containing Zr are somewhat improved in wear resistance, whereas they are all deteriorated in saturated magncetic flux density and effective magnetic permeability.

element selected from a group consisting of rare earth elements, Zr and Nb, and the balance Fe.

4. The high permeability alloy, as recited in claim 1, consisting essentially of 3 to 10 wt% Al, 4 to 11 wt% Si, 2.1 to 20.0 wt% Ru, 0.2 to 5.0 wt% Ti, 0.01 to 1.0 wt% of at least one element selected from a group consisting of rare earth elements, Zr and Nb, and the balance Fe.

5. The high permeability alloy, as recited in claim 1, consisting essentially of 3 to 10 wt% Al, 4 to 11 wt% Si, 2.1 to 20.0 wt% Ru, 0.5 to 20.0 wt% Cr and the balance Fe.

TABLE 5

| Alloy | No | Composition (%) Si | Al | Ru | Cr | Other | Fe | Saturated magnetic flux density Bs (G) | Coercive force Hc (Oe) | Effective permeability (μe) | Wear depth (μm) |
|---|---|---|---|---|---|---|---|---|---|---|---|
| Alloy of invention | 1 | 8.0 | 8.0 | 2.2 | 3.0 | — | Balance | 8,100 | 0.03 | 11,500 | 1.2 |
| Alloy of invention | 2 | " | " | 3.0 | " | — | " | 8,600 | 0.04 | 13,300 | 1.1 |
| Alloy of invention | 3 | " | " | 5.0 | " | — | " | 9,300 | 0.04 | 14,500 | 1.0 |
| Alloy of invention | 4 | " | " | " | 1.0 | — | " | 9,700 | 0.03 | 16,100 | 1.6 |
| Alloy of invention | 5 | " | " | " | 2.0 | — | " | 9,500 | 0.04 | 15,800 | 1.3 |
| Alloy of invention | 6 | 6.0 | 10.0 | " | 6.0 | — | " | 7,700 | 0.04 | 10,100 | 0.8 |
| Alloy of invention | 7 | 4.0 | 12.0 | " | 10.0 | — | " | 7,500 | 0.05 | 7,300 | 0.6 |
| Alloy of invention | 8 | 4.0 | 8.0 | " | 15.0 | — | " | 6,900 | 0.06 | 5,200 | 0.5 |
| Alloy of invention | 9 | 3.0 | " | " | 20.0 | — | " | 6,000 | 0.07 | 4,500 | 0.3 |
| Alloy of invention | 10 | 8.0 | " | 7.0 | 3.0 | — | " | 7,400 | 0.06 | 8,600 | 0.7 |
| Alloy of invention | 11 | " | " | 10.0 | " | — | " | 7,100 | 0.08 | 6,400 | 0.5 |
| Alloy of invention | 12 | " | " | 15.0 | " | — | " | 6,200 | 0.09 | 5,900 | 0.4 |
| Alloy of invention | 13 | " | " | 20.0 | " | — | " | 5,100 | 0.11 | 5,500 | 0.2 |
| Alloy of invention | 14 | 4.0 | 6.0 | 2.2 | " | — | " | 11,500 | 0.05 | 5,300 | 1.4 |
| Alloy of invention | 15 | " | " | 5.0 | " | — | " | 12,000 | 0.06 | 4,700 | 1.2 |
| Alloy of invention | 16 | 9.6 | 6.0 | 5.0 | 3.0 | — | " | 8,400 | 0.06 | 8,700 | 1.1 |
| Conventional alloy | 17 | 9.6 | 6.0 | — | — | — | " | 9,200 | 0.02 | 13,500 | 9.2 |
| Conventional alloy | 18 | 9.4 | 6.5 | — | — | — | " | 8,800 | 0.03 | 12,000 | 9.5 |
| Conventional alloy | 19 | 8.0 | 8.0 | — | 3.0 | — | " | 7,300 | 0.04 | 11,300 | 6.4 |
| Conventional alloy | 20 | 8.0 | 8.0 | — | " | Ti 1.0 | " | 7,000 | 0.03 | 11,000 | 5.4 |
| Conventional alloy | 21 | 8.0 | 8.0 | — | " | Zr 0.1 | " | 6,800 | 0.03 | 10,500 | 5.1 |
| Conventional alloy | 22 | 8.0 | 8.0 | — | 6.0 | Zr 0.1 | " | 4,800 | 0.05 | 4,000 | 3.2 |
| Conventional material (Ferrite) | 23 | — | — | — | — | — | " | 5,000 | 0.1 | 10,000 | 1.9 |
| Conventional material (Permalloy) | 24 | — | — | — | — | — | " | 8,000 | 0.02 | 10,000 | 52.0 |

What is claimed is:

1. A high permeability alloy having an excellent wear resistance, consisting essentially of 3 to 10 wt% Al, 4 to 11 wt% si, 2.1 to 20.0 wt% Ru and the balance Fe.

2. The high permeability alloy, as recited in claim 1, consisting essentially of 3 to 10 wt% Al, 4 to 11 wt% Si, 2.1 to 20.0 wt% Ru, 0.2 to 5.0 wt% Ti, and the balance Fe.

3. The high permeability alloy, as recited in claim 1, consisting essentially of 3 to 10 wt% Al, 4 to 11 wt% Si, 2.1 to 20.0 wt% Ru, 0.01 to 1.0 wt% of at least one element

6. A magnetic head of a high permeability alloy having excellent wear resistance, which consists essentially of 3 to 10 wt% Al, 4 to 11 wt% Si, 2.1 to 20.0 wt% Ru, and the balance Fe.

7. The magnetic head, as defined in claim 6, consisting essentially of 3 to 10 wt% Al, 4 to 11 wt% Si, 2.1 to 20.0 wt% Ru, 0.2 to 5.0 wt% Ti, and the balance Fe.

8. The magnetic head, as defined in claim 6, consisting essentially of 3 to 10 wt% Al, 4 to 11 wt% Si, 2.1 to 20.0 wt% Ru, 0.01 to 1.0 wt% of at least one element selected from a group consisting of rare earth elements, Zr and Nb, and the balance Fe.

9. The magnetic head, as defined in claim 6, consisting essentially of 3 to 10 wt% Al, 4 to 11 wt% Si, 2.1 to 20.0 wt% Ru, 0.2 to 5.0 wt% Ti, 0.01 to 1.0 wt% of at least one element selected from a group consisting of rare earth elements, Zr and Nb, snd the balance Fe.

10. The magnetic head, as defined in claim 6, consisting essentially of 3 to 10 wt% Al, 4 to 11 wt% Si, 2.1 to 20.0 wt% Ru, 0.5 to 20.0 wt% Cr and the balance Fe.

* * * * *